Oct. 14, 1958     E. H. BLATTNER     2,856,078
RAILWAY DRAFT GEAR
Filed Dec. 15, 1954

Inventor:
Emil H. Blattner
By Wilmer Mechlin
his Attorney

United States Patent Office 2,856,078
Patented Oct. 14, 1958

2,856,078

RAILWAY DRAFT GEAR

Emil H. Blattner, Williamsville, N. Y., assignor to The Symington-Gould Corporation, Depew, N. Y., a corporation of Maryland Application December 15, 1954, Serial No. 475,350

9 Claims. (Cl. 213—32)

This invention relates generally to draft gears for railway cars and particularly to combined rubber and friction draft gears in which the several cushioning units are contained in a friction housing.

Heretofore, numerous draft gears have been proposed in which both rubber and friction units contained in a friction housing are employed to cushion buffing and draft forces transmitted to railway cars. As in all draft gears other than those of the cushion underframe type, the problem confronted is to provide a draft gear of sufficient capacity within the space limitations of the A. A. R. standard draft gear pocket. The combined rubber and friction draft gear has the advantage in this regard of affording higher ultimate capacity than a friction and coil or like spring gear due to the shock absorbtive properties of rubber. However, the capacities of the rubber cushioning units of such gears have never been enabled to reach those of rubber gears of the non-housed type such as the "Waugh-Mat Twin Cushion," because of the restrictions imposed by the housing on the transverse dimensions of the rubber unit. Thus, in all combined rubber and friction draft gears thus far proposed, it has been deemed essential that the rubber cushioning unit either be completely enclosed by the housing or that it be contained at least in part on all sides, thus restricting the transverse dimensions of the rubber unit to the interior dimensions of the portion of the housing in which it is contained. It has now been found possible to dispense with an opposing pair of longitudinal walls of the housing without detriment to the service life of the draft gear, so that the rubber cushioning unit is restricted in only one transverse dimension by the housing and in the other transverse dimension can extend to the full extent permitted by the draft gear pocket, this usually being the corresponding outside transverse dimension of the housing. As the result, it is made possible not only to increase the capacity of the rubber cushioning unit to that of the corresponding unit in a non-housed gear but to insert the entire rubber unit, as a unit, through a side of the housing instead of inserting its components separately, usually through the mouth of the housing.

It is therefore the primary object of the invention to provide an improved combined rubber and friction draft gear of the housed type wherein a pair of the opposed longitudinal walls of the housing are dispensed with over the portion containing the rubber cushioning unit so that the latter is restricted in only one transverse dimension by the housing.

Another object of the invention is to provide an improved combined rubber and friction draft gear of the housed type wherein the housing over the portion containing the rubber cushioning unit is open from side to side along one transverse dimension to the full extent of the other transverse dimension, whereby the rubber unit is restricted in only one transverse dimension by the housing and may be inserted as a unit through the transverse opening therein.

An additional object of the invention is to provide an improved combined rubber and friction draft gear of the housed type, wherein both the rubber and friction cushioning units are contained longitudinally within the housing by a plunger extending into the mouth of the housing and insertible therein without canting through the use of retaining means welded to the housing.

Other objects and advantages of the invention will appear hereinafter in the detailed description, be particularly pointed out in the appended claims, and be illustrated in the accompanying drawings, in which:

Figure 1:
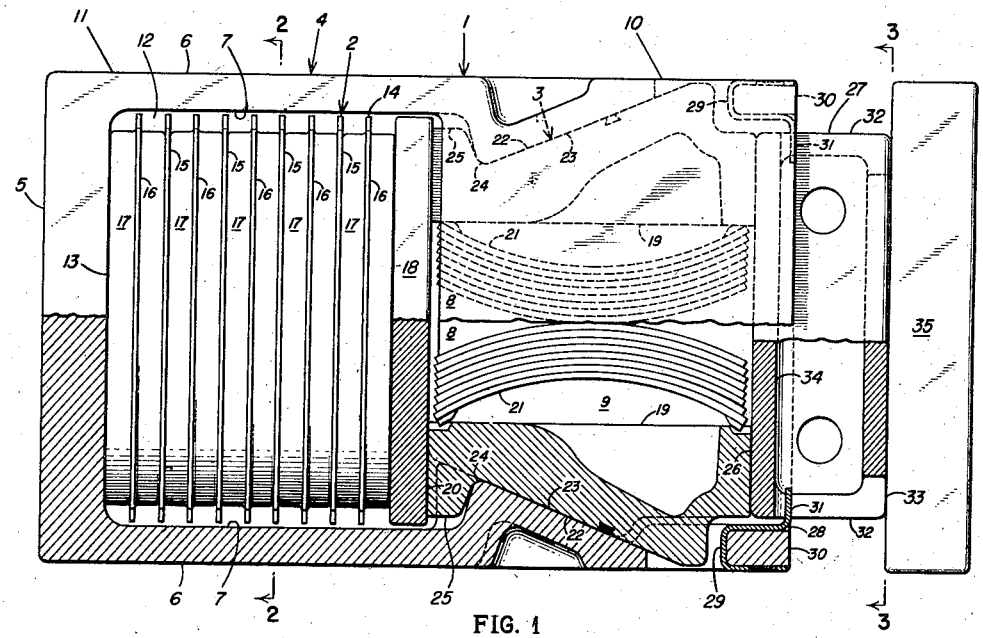
Figure 1 is a plan view of a preferred embodiment of the draft gear of the present invention with portions broken away and shown in section to more clearly illustrate certain of the details of construction.
Figure 2:
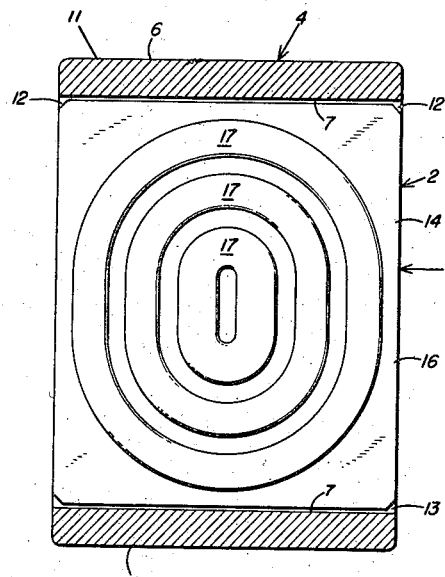
Figure 2 is a vertical sectional view taken along the lines 2—2 of Figure 1.
Figure 3:
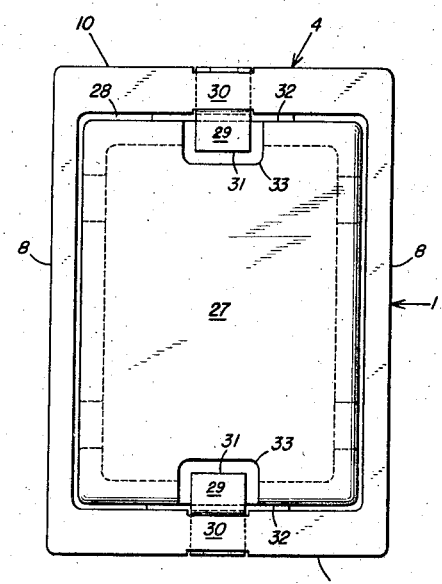
Figure 3 is a vertical sectional view taken along the lines 3—3 of Figure 1.
Figure 4:
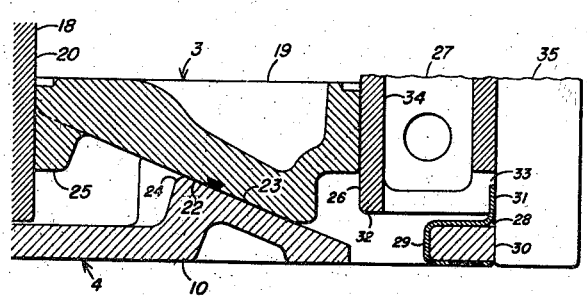
Figure 4 is a fragmentary view on an enlarged scale and partly in section of a front corner portion of the draft gear of Figure 1 showing the relation between the several elements on full compression of the draft gear.

Referring now in detail to the drawings, in which like reference characters designate like parts, the improved combined rubber and friction draft gear of the housed type of the present invention has been illustrated in the accompanying drawings by a draft gear 1 which typifies the invention in having both rubber and friction cushioning units 2 and 3, respectively, and in the construction of the portion of its friction housing 4 in which the rubber cushioning unit 2 is seated. However, in the particular forms of these units, it is merely exemplary, other forms of both these units and the housing, except for the open-sidedness of the latter over the seat of the rubber cushioning means, being equally employable in accordance with the invention.

As is customary in the use of draft gears, that of the illustrated embodiment is designed to be contained between center sills (not shown) in a draft gear pocket of standard A. A. R. dimensions, and to have its housing 4 remain stationary in buff and be pulled forward in draft by a yoke (not shown), the particular form of which will depend on the type of coupler to which the draft gear is applied, but which usually will be a vertical yoke. The rubber and friction cushioning units 2 and 3 are arranged or disposed in tandem with the rubber cushioning unit preferably in the rear. In accordance with this preferred construction the housing 4 is comprised of a rear wall 5 joining a pair of forwardly extending transversely or laterally spaced longitudinal walls 6, between the substantially parallel planar opposing faces 7 of which is embraced the rubber cushioning unit 2. Beyond the forward extremity of the rubber cushioning unit the longitudinal walls 6 are connected at their sides by a pair of transversely spaced longitudinal walls 8, the several longitudinal walls together enclosing part of the housing on all sides and forming therewithin a pocket 9 for the reception of the friction cushioning unit 3. The housing 4 thus is divided longitudinally into two portions, a forward portion 10 closed on all sides and seating the friction unit 3 and a rearward portion 11 joining the forward portion and the rear wall 5. The rearward portion is closed on but two sides and, through the transversely aligned openings or slots 12 in the other two sides spacing the rear wall 5 and second pair of longitudinal walls 8, providing an open-sided pocket or seat 13 which extends transversely or laterally through the housing and which is unrestricted transversely except in the dimension determined by the spacing of the opposing faces 7 of the pair of defining longitudinal walls 6.

While, as previously mentioned, the rubber cushioning unit 2 and friction cushioning unit 3 may be of any of the forms suitable for use in draft gears, particular forms are here shown and will now be described. As typical of rubber cushioning units, the illustrated unit 2 is of the type known as a "Waugh-Mat" which is made up of rubber spring elements 14 alternating longitudinally with and divided or separated by spacer or separating plates 15, each of the spring elements being formed of a center plate 16 carrying on either side a plurality of annular rubber pads 17. Bearing at the rear against the rear wall 5 the rubber cushioning unit 2 at the front engages a floating follower or follower plate 18 through which longitudinal forces are transmitted between the rubber and friction cushioning units. To eliminate slack on the initial application of longitudinal forces, it is conventional to place rubber cushioning units under initial compression and here intended that the rubber cushioning unit 2 be precompressed and applied as a unit with the floating follower 18 through one or the other of the open sides 12 of the rear pocket 13.

In the description thus far no distinction has been drawn between the horizontal top and bottom and the vertical side walls of the housing, all being classed as longitudinal walls. It is contemplated that the pair of longitudinal or side walls on opposite sides of the housing, whether they be the vertical side walls or horizontal top and bottom walls, be dispensed with or open over the longitudinal confines of the pocket for the rubber unit, so that the rubber cushioning unit can extend transversely in one direction at least the full corresponding outside dimension of the housing 4.

The friction cushioning unit 3, selected for purposes of illustration, is in most respects similar to that of the draft gear of my Patent 2,540,041 of January 30, 1951. As in that patent, it is comprised of a pair of counterpart friction wedges or shoes 19 bearing against and rubbing or wiping on the front face 20 of the floating follower 18, the wedges being urged laterally or transversely of the housing by a pair of sets of semi-elliptic leaf springs 21. Each of the wedges 19 has a friction face 22 which is preferably flat and inclined or sloping longitudinally of the housing 4, the friction faces, relative to each other, flaring or diverging forwardly of the housing. Each of these friction faces 22, in turn, acts on a correspondingly inclined or sloping friction surface 23 formed on the inner face of the opposing of the longitudinal walls 6 or 8 of the housing, these longitudinal walls here being the same as those containing the rubber cushioning unit 2. To limit forward movement of the wedges 19 relative to the housing 4, each of the friction surfaces 23 on the housing terminates at the rear in a shoulder 24 instanding transversely of the housing and adapted to engage a lip or flange 24 outstanding transversely from the associated of the wedges 19.

The illustrated draft gear being of the plunger type, the wedges 19 are contained entirely within the housing 4 and at the front bear against and rub or wipe on the inner face 26 of a plunger 27 which extends or projects into the open mouth 28 of the housing. Conventionally, a plunger is retained in the housing of a draft gear by opposed interfitting lugs cast integrally with the plunger and housing, thus necessitating canting of the plunger during its insertion sufficiently to clear both of the lugs with corresponding excessive lateral play of the plunger when seated in the housing. It is here contemplated to minimize or eliminate entirely the necessity for canting by replacing the integral interlocking lug or lugs at one or both sides of the opening in the open end of the housing by retaining means carried by the housing or the plunger and initially withdrawn laterally relative to the other member, so as not to interfere with insertion of the plunger, the retaining means, after the plunger has been inserted, being bendable or drivable so as to overlap laterally the other of the members and lock the components of the draft gear in assembled relation. In the illustrated embodiment both of the conventional integral lugs are replaced by such retaining means, the retainers in the form shown being a pair of retaining plates or clips 29, each of which, when first applied, is of U-shape and is slid or clipped over and embraces one of a pair of bridges or webs 30 disposed centrally at opposite sides of the housing. Secured to the bridges, as by plug welding, the retaining plates 29 initially have their inner legs 31 extending forwardly of the housing and in substantially parallel relation so as to permit the plunger 27 to be slid therebetween. Of block shape, the plunger has its sides 32 confronting the retaining plates 29 interrupted centrally by slots 33 which terminate inwardly at the inner wall 34 of the plunger. With this arrangement it is only necessary, after the plunger is inserted in the housing, to bend in the projecting ends or tabs 35 of the inner legs 31 of the retaining plates 29 so that they overlap the inner wall 34 of the plunger, to ensure retaining of the plunger in assembled relation with the housing. Since in its illustrated form the plunger 27 is parallel-sided and narrower laterally than the housing 4, the assembly is completed by a front follower block 35 of sufficient width to engage front draft lugs (not shown) against which the draft gear reacts under draft forces.

From the above detailed description it will be apparent that there has been provided an improved combined rubber and friction draft gear of the housed type which, through the open-sidedness of its housing over the portion seating the rubber cushioning unit, is enabled to accommodate a rubber unit of greater capacity than heretofore employable in a housing by enabling the rubber unit to extend transversely through the housing and permitting it to be inserted as a unit through the side of the housing. It should be understood that the described and disclosed embodiment is merely exemplary of the invention and that all modifications are intended to be included which do not depart either from the spirit of the invention or the scope of the appended claims.

Having described my invention, I claim:

1. A draft gear comprising a housing open at one end, an opening extending transversely through and unrestricted in one transverse dimension by said housing, said opening opening longitudinally toward said open end of said housing, a rubber cushioning unit in said housing and insertible as a unit through said opening, and a friction cushioning unit in and frictionally engaging said housing beyond said opening and arranged in tandem with said rubber cushioning unit.

2. A draft gear comprising a housing, an open-sided pocket in said housing intermediate ends and opening longitudinally toward one end thereof, a rubber cushioning unit seated in said seat and substantially coextensive in one transverse direction with the corresponding outside dimension of said housing, and a friction cushioning unit contained transversely by said housing beyond said opening and arranged therein in tandem with said rubber cushioning unit.

3. A draft gear comprising a housing, a pocket in and confined transversely by longitudinal walls of said housing, a friction cushioning unit seated in said pocket and frictionally engaging certain of said longitudinal walls, a pocket in said housing inwardly of and connected to said first named pocket, transversely aligned openings in certain of said longitudinal walls and substantially coextensive in cross-section with said second named pocket, and a rubber cushioning unit insertible as a unit into said second named seat through one of said openings and when seated projecting transversely into said openings substantially to the corresponding outer walls of said housing.

4. A draft gear comprising a housing, a pocket in and confined transversely by longitudinal walls of said housing, a second pocket in said housing and confined only in one transverse direction by certain of said longitudinal walls thereof, each of said pockets opening longitudinally toward an end of said housing, a friction cushioning unit seated in said first named pocket, and a rubber cushioning unit seated in said second named pocket and arranged in tandem with said friction cushioning unit, said rubber cushioning unit being limited in one transverse dimension by said certain longitudinal walls and in the other transverse dimension being substantially coextensive with the corresponding dimension of said housing.

5. A draft gear comprising a housing open at one end, a friction unit in and frictionally engaging said housing adjacent said open end thereof, a pocket within said housing intermediate a closed end thereof and said friction cushioning unit and open to said unit, a rubber cushioning unit seated within said pocket, laterally aligned slots in longitudinal walls of said housing at opposite sides of said pocket, each of said slots being of sufficient longitudinal cross-section for insertion of said rubber cushioning unit as a unit therethrough into said pocket, and said rubber cushioning unit when seated projecting laterally beyond said pocket into said slots.

6. In a combined rubber and friction draft gear, a housing for containing rubber and friction cushioning units, said housing comprising a pair of transversely spaced longitudinal walls, a rear wall connecting said longitudinal walls at one end, a second pair of transversely spaced longitudinal walls connecting said first named pair adjacent their opposite end and spaced forwardly from said rear wall, said several longitudinal walls laterally defining an open-ended pocket for the reception of a friction cushioning unit, and said first named pair of longitudinal walls intermediate said second named pair and said rear wall being unconnected and laterally defining an open-sided pocket for the reception of a rubber cushioning unit substantially coextensive in one transverse dimension with the corresponding outside dimension of said housing.

7. A combined rubber and friction draft gear comprising a housing open at one end, a friction cushioning unit within said housing and confined on all sides by longitudinal walls thereof, a rubber cushioning unit in said housing inwardly of and open to said friction cushioning unit and insertible as a unit thereinto through openings in opposite sides of said housing, a plunger extending into said open end of said housing, and plate means fixed to opposite sides of said housing adjacent said open end, said plate means having portions initially substantially parallel for insertion of said plunger and drivable inwardly for laterally overlapping said plunger and maintaining said plunger and cushioning units in assembled relation.

8. A combined rubber and friction draft gear comprising a housing member open at one end, a friction cushioning unit within said housing and confined on all sides by longitudinal walls thereof, a rubber cushioning unit in said housing inwardly of and open to said friction cushioning unit and extending transversely into openings in opposite sides of said housing, a plunger member extending into said open end of said housing, and retaining means carried by one of said members and adapted to overlap laterally said other member for maintaining said plunger and cushioning units in assembled relation, at least one of said retaining means being initially withdrawn clear of said other member and being drivable laterally to overlap said other member after insertion of said plunger.

9. In a draft gear, the combination of a housing, a pocket in said housing intermediate longitudinal ends thereof and opening toward one of said ends, transversely aligned openings in opposite side walls of said housing and substantially coextensive in longitudinal cross-section with said pocket, and a rubber cushioning unit insertible as a unit into said pocket through one of said openings and when seated projecting transversely into said openings substantially to the corresponding outer surfaces of said housing.

References Cited in the file of this patent

UNITED STATES PATENTS

| | | |
|---|---|---|
| 1,946,476 | Barrows | Feb. 13, 1934 |
| 2,039,268 | Barrows | Apr. 28, 1936 |
| 2,527,589 | Spence et al. | Oct. 31, 1950 |
| 2,535,197 | Dath | Dec. 26, 1950 |
| 2,674,449 | Tucker | Apr. 6, 1954 |